United States Patent
Showghi et al.

(10) Patent No.: US 6,920,431 B2
(45) Date of Patent: Jul. 19, 2005

(54) REMOTE ORDERING SYSTEM AND METHOD

(75) Inventors: Robert S. Showghi, San Diego, CA (US); Scott Juds, Seattle, WA (US)

(73) Assignee: I3E Holdings, LLC, San Diego, CA (US)

( * ) Notice: Subject to any disclaimer, the term of this patent is extended or adjusted under 35 U.S.C. 154(b) by 43 days.

(21) Appl. No.: 10/213,984

(22) Filed: Aug. 7, 2002

(65) Prior Publication Data

US 2003/0050854 A1 Mar. 13, 2003

Related U.S. Application Data

(63) Continuation of application No. 09/857,509, filed as application No. PCT/US00/11337 on Apr. 27, 2000, now Pat. No. 6,473,739.
(60) Provisional application No. 60/131,119, filed on Apr. 27, 1999.

(51) Int. Cl.[7] .............................................. G06F 17/60
(52) U.S. Cl. ......................................... 705/26; 705/15
(58) Field of Search ..................................... 705/26, 27

(56) References Cited

U.S. PATENT DOCUMENTS

| | | | |
|---|---|---|---|
| 4,415,065 A | | 11/1983 | Sandstedt ..................... 186/39 |
| 4,530,067 A | | 7/1985 | Dorr ........................... 364/900 |
| 4,553,222 A | | 11/1985 | Kurland et al. .............. 364/900 |
| 4,569,421 A | | 2/1986 | Sandstedt ..................... 186/39 |
| 5,198,976 A | | 3/1993 | Form et al. .................. 364/410 |
| 5,235,509 A | | 8/1993 | Mueller et al. .............. 364/405 |
| 5,504,589 A | | 4/1996 | Montague et al. ........... 358/403 |
| 5,664,110 A | | 9/1997 | Green et al. .................. 705/26 |
| 5,845,263 A | | 12/1998 | Camisa et al. ................ 705/27 |
| 5,889,268 A | * | 3/1999 | Swartz ........................ 235/385 |
| 5,912,743 A | | 6/1999 | Kinebuchi et al. ........... 358/442 |
| 5,914,671 A | * | 6/1999 | Tuttle ....................... 340/10.42 |
| 5,991,749 A | * | 11/1999 | Morrill, Jr. ................... 705/44 |
| 6,208,976 B1 | | 3/2001 | Kinebuchi et al. ............. 705/15 |
| 6,473,739 B1 | * | 10/2002 | Showghi et al. ............... 705/26 |
| 2001/0018660 A1 | * | 8/2001 | Sehr ............................... 705/5 |
| 2002/0057298 A1 | * | 5/2002 | Wassom et al. ............. 345/825 |
| 2003/0078793 A1 | * | 4/2003 | Toth ............................... 705/1 |

FOREIGN PATENT DOCUMENTS

JP          404169966 A  *  6/1992    ........... G06F/15/21

OTHER PUBLICATIONS

Cavanaugh, Susan "Football concessions score with upscale, classic items", Nation's Restaurant News, vol. 28, No. 35, Sep. 5, 1994.*

Football Consessions Score with Upscale, Classic Items the Weekly Newspaper of the Food Service Industry vol. 28 Issue 35.

* cited by examiner

Primary Examiner—Wynn W. Coggins
Assistant Examiner—Naeem Haq
(74) Attorney, Agent, or Firm—David A. Greenlee

(57) ABSTRACT

A system and method for enabling patrons at large venues, such as spectator venues, convention halls, or airports, which have identifiable delivery locations, to utilize handheld, wireless communication devices to self-order food, drink, souvenir items or services from remote order fulfillment locations within the venue for delivery to the identified delivery locations. Verification of available service level is provided. Hierarchical menus can be provided for visual display or audible presentation of items or services for purchase on the devices, or for presenting other information. A delivery location identification code is provided with the order, which is acknowledged. Automatic electronic payment for the order occurs by prearranged means.

26 Claims, 10 Drawing Sheets

| KingDome | Please Confirm |
| Seattle, WA | KingDome |
| Enter Location? | Section: 10 |
| Section: 10 | Row: 17 |
| Row: 17 | Seat: 9 |
| Seat: 9 | Yes        No |

| County Stadium Seating Sections | | |
|---|---|---|
| | First Section | Last Section |
| Floor level sections | 10 | 12 |
| First level sections | 100 | 118 |
| Second level sections | 200 | 222 |
| Third level sections | 300 | 328 |

60 points to the first table.

| Section 202 Seating Layout | | Menu B |
|---|---|---|
| Row Number | First Seat | Last Seat |
| A | 1 | 22 |
| B | 1 | 22 |
| C | 1 | 22 |
| D | 1 | 21 |
| E | 1 | 21 |
| F | 1 | 21 |
| G | 1 | 21 |
| H | 1 | 20 |
| I | 6 | 20 |
| J | 6 | 20 |
| K | 6 | 20 |

61, 62, 63

| Section 203 Seating Layout | | Menu C |
|---|---|---|
| Row Number | First Seat | Last Seat |
| A | 1 | 22 |
| B | 1 | 22 |
| C | 1 | 22 |
| D | 1 | 21 |
| E | 1 | 21 |
| F | 1 | 21 |
| G | 1 | 21 |
| H | 1 | 20 |
| I | 6 | 20 |
| J | 6 | 20 |
| K | 6 | 20 |

| Convention Center Aisles | | | | 65 |
|---|---|---|---|---|
| | First Aisle | Last Aisle | Menu | |
| First Level Aisles | 100 | 900 | A | |
| Second Level Aisles | 200 | 215 | B | |

| First Level Booth Layout | | |
|---|---|---|
| Aisle Number | First Booth | Last Booth |
| 100 | 101 | 142 |
| 200 | 201 | 239 |
| 300 | 301 | 341 |
| 400 | 401 | 440 |
| 500 | 501 | 538 |
| 600 | 601 | 644 |
| 700 | 701 | 723 |
| 800 | 801 | 824 |
| 900 | 901 | 921 |

Fig. 7B

| County Airport Gate Layout | | | | 65 |
|---|---|---|---|---|
| Concourse | First Gate | Last Gate | Menu | |
| A | A1 | A14 | A | |
| B | B1 | B22 | A | |
| C | C1 | C22 | B | |
| D | D1 | D14 | A | |
| N | N1 | N18 | C | |
| S | S1 | S18 | B | |

```
1 - Sandwiches
2 - Snacks
3 - Candy
4 - Soft Drinks
5 - Beer
6 - Wine
7 - Check Out
SELECTION:___
```
(66 points to items 5, 6)

Fig. 8B

```
1 - Sandwiches
2 - Snacks
3 - Candy
4 - Soft Drinks
5 - Check Out
SELECTION:___
```

Fig. 8C

```
1 - Bottled Water
2 - Diet Cola
3 - Regular Cola
4 - Orange Soda
5 - Pilsner Beer
6 - Light Beer
7 - Cabernet Wine
8 - Chardonnay Wine
SELECTION:___
```
(66 points to items 5, 6, 7, 8)

Fig. 8D

```
1 - Bottled Water
2 - Diet Cola
3 - Regular Cola
4 - Orange Soda
SELECTION:___
```

| | 82 | |
|---|---|---|
| | Data Field | Data Value |
| 70 | Device I.D. | 206-365-3130 |
| | First Name | Scott |
| | Last Name | Juds |
| | Address | 3431 Oakes Ave. |
| | City | Everett |
| | State | WA |
| | Country | United States |
| | Postal Code | 98203 |
| 72 | Email Address | scottjuds@d4s.com |
| | Credit Card | Visa |
| | Card Number | 1234432112344321 |
| | Expiration | 02/03 |
| 76 | P.I.N. | 9690 |
| | Venue #1 | Safeco Stadium |
| 74 | - Event Type | MLB |
| | - Seat History | Season Ticket | 78
| | - Seat Section | 212 |
| | - Seat Row | K |
| 76 | - Seat Number | 4 |
| | Venue #2 | Key Arena |
| | - Event Type | NBA |
| | - Seat History | 03/22/2002 | 80
| | - Seat Section | 35 |
| | - Seat Row | 14 |
| | - Seat Number | 6 |

Fig. 10A

| | 84 |
|---|---|
| Data Field | Data Value |
| Account I.D. | 123ABC456DEF |
| First Name | Scott |
| Last Name | Juds |
| Address | 3431 Oakes Ave. |
| City | Everett |
| State | WA |
| Country | United States |
| Postal Code | 98203 |
| Email Address | scottjuds@d4s.com |
| Credit Card | Visa |
| Card Number | 1234432112344321 |
| Expiration | 02/03 |
| Sale Date | 05/04/2002 |
| - Venue Name | Key Arena |
| - Event Type | NBA |
| - Event Date | 05/07/2002 |
| - Seat Section | 31 |
| - Seat Row | 22 |
| - Seat Number | 12 |
| - Net Price | $35.95 |

Fig. 10B

| Data Field | Data Value |
|---|---|
| Device I.D. | 206-365-3130 |
| First Name | Scott |
| Last Name | Juds |
| Address | 3431 Oakes Ave. |
| City | Everett |
| State | WA |
| Country | United States |
| Postal Code | 98203 |
| Email Address | scottjuds@d4s.com |
| Credit Card | Visa |
| Card Number | 1234432112344321 |
| Expiration | 02/03 |
| P.I.N. | 9690 |
| Venue #1 | Safeco Stadium |
| - Event Type | MLB |
| - Seat History | Season Ticket |
| - Seat Section | 212 |
| - Seat Row | K |
| - Seat Number | 4 |
| Venue #2 | Key Arena |
| - Event Type | NBA |
| - Seat History | Last Order |
| - Seat Section | 35 |
| - Seat Row | 14 |
| - Seat Number | 6 |
| - Polish Sausage | 5 |
| - B.B.Q. Ribs Plate | 3 |
| - Cheeseburger | 1 |
| - Hamburger | 2 |
| - MGD Beer | 6 |
| - Diet Coke | 3 |
| - Bottled Water | 5 |

Fig. 11B

```
1 - Hot Dog
2 - Polish Sausage
3 - Hamburger
4 - Cheeseburger
5 - Veggie Burger
6 - Chicken Sandwich
7 - B.B.Q. Ribs Plate
SELECTION:___
```

Fig. 11A

```
1 - Polish Sausage
2 - B.B.Q. Ribs Plate
3 - Cheeseburger
4 - Hamburger
5 - Chicken Sandwich
6 - Hot Dog
7 - Veggie Burger
SELECTION:___
```

Fig. 11C

REMOTE ORDERING SYSTEM AND METHOD

CROSS REFERENCE TO RELATED APPLICATIONS

This application is a continuation-in-part of U.S. application Ser. No. 09/857,509, filed Jun. 1, 2001, now U.S. Pat. No. 6,473,739 which is a national filing of PCT/US00/11337, filed Apr. 27, 2000, which claims priority of U.S. Provisional Patent Application No. 60/131,119, filed Apr. 27, 1999.

BACKGROUND OF THE INVENTION a. Field of the Invention

This invention relates generally to the remote ordering of goods and, more particularly, to a remote ordering method and system in which patrons utilize wireless hand-held devices to order menu items at large venues, such as stadiums, arenas, airports or convention centers, which have identifiable seat, gate, or booth locations, for delivery of the ordered goods to an identified location.

b. Description of Related Art

Sporting events, concerts and other large gatherings of spectators, or patrons take place in an arena, stadium, or other confined facility or venue having seating in uniquely identifiable seats, which are usually reserved or assigned. At these events, the ability of patrons to secure refreshments in the form of food and drink is limited. It is customary for hungry and thirsty patrons to await the arrival of roving vendors who intermittently traverse the aisles of the facility hawking various items of food and drink. These vendors frequently carry only a single type of food or drink. Often a wait of many minutes must be endured until a vendor appears who, hopefully but infrequently, has the item sought. Even then, the vendor may not have the correct change and considerable disruption occurs to those other patrons seated between the purchaser and the vendor. This is a very ineffective and inefficient method of ordering and delivering items of food, drink and merchandise to patrons.

The other method of obtaining food or drink is to queue up in long lines at refreshment or concession stands, which are scattered outside the main area in the hallways of the venue, where several, but not all, types of refreshments can often be purchased together at a single stand.

It is also common for venue operators to sell souvenir merchandise, such as programs, pennants, T-shirts, caps, trinkets, and CDs. These may also be occasionally purchased from the roving vendors in the facility, but, more often, must be purchased from a merchandise or concession stand elsewhere in the facility. However, it is seldom possible to purchase all of these items at a single concession stand.

As a result, a patron wishing to purchase several different types of food and drink and some items of merchandise must wait for multiple vendors and also visit multiple stands, probably missing seeing part of the event taking place in the venue. Thus, there is a need for a system whereby patrons can order items from a remote location for delivery to their seats.

Trade show exhibitors have a similar problem. They must be present in their booth to describe their products and services to the show attendees. If the exhibitor leaves the booth to get food and drink, important prospective customers may be missed. Since most exhibitors' booths are minimally staffed, many exhibitors remain captive in their booths throughout the exhibition hours with out relief of food and drink.

Even air travelers are not without the food and drink problem. Passengers with much carryon luggage or with children, or both, often avoid concession stands in airport concourses because it is difficult to deal with luggage or restless children when there are food lines and flimsy trays of food and drink to carry somewhere to eat. The plight of the hungry air traveler is further compounded by the continuing reduction of in-flight food service throughout the airline industry.

Remote ordering systems, in which items are ordered from a location remote from item supply, are known in the prior art. However, these systems do not address the problems outlined above. For example, U.S. Pat. No. 5,664,110 discloses a remote ordering system intended for use by homeowners or businesses to facilitate ordering from multiple vendors without the need to travel to the vendor. This patented system is similar to current systems of placing orders from a business office computer environment over the Internet or other telecommunications links using complex menus to obtain numerous parts from numerous possible business suppliers and vendors. This is distinctly different from the problem of a patron remotely ordering food, beverages and souvenir menu items from vendor facilities located in the same building structure for delivery to the patron's seat. Furthermore, this system is unduly complex in that it requires use of secondary data input devices, such as bar code scanners and the like to input desired product codes.

The remote order terminals described in U.S. Pat. Nos. 4,415,065 and 4,569,421 are intended and suited for use by the employees serving the customer/patron, rather than for use by the patron himself. For example, in its restaurant application, the patron uses a wireless paging system to summon the employee operating the remote order terminal. The order function is then carried out by the employee, but does not address the problems described above, since an intervening employee action is required.

U.S. Pat. No. 5,235,509 discloses a customer self-ordering system. However, this patent teaches use of a kiosk-style touch screen monitor self-ordering system for places such as fast food restaurants. This would require patrons to leave their seats, and, consequently, does not address the problems described above, since the patron must leave his seat and journey to a fixed location to order.

U.S. Pat. No. 6,208,976 discloses a customer self-ordering system. However, this patent teaches use of a table mounted touch screen monitor self-ordering system for restaurants, which proposes application in sports stadiums. While such a system is technically possible in a stadium, the installation cost of providing a monitor at each seat in a 70,000-seat stadium would be staggering, as would be the maintenance and repair costs of units damaged in such an environment. This model has been twice tried and twice failed by prominent well-funded companies in recent year, because of the poor economic value of such a system in a stadium.

There is a need for a system whereby patrons having identifiable locations, such as seats, booths or gates in a large venue can remotely order various menu items, such as food, drink, souvenir merchandise, and services from a remote order fulfillment location and have the order delivered within that venue to their identified location.

There is also a need to provide a system which includes a provision for remote automatic payment for the order, without intervention by the patron or delivery personnel, except where predicated upon acknowledgement of order delivery; this eliminates the distraction and hassle of engaging in a cash-and-change situation in the venue.

There is another need to provide a system that incorporates location checking features not required by prior art fixed-mounted and waiter-based systems to determine the level of service available for a specific location.

There is a further need to provide a system having means to separately control the availability of whole classes of items, such as alcoholic beverages, for delivery.

BRIEF SUMMARY OF THE INVENTION

It is, therefore, an object of this invention is to provide a system whereby patrons having identifiable locations, such as seats, booths or gates in a large venue can remotely order various menu items, such as food, drink, souvenir merchandise, and services from a remote order fulfillment location and have the order delivered within that venue to their identified location.

It is also an object to provide a system that includes a provision for remote payment for the order, without intervention by the patron or delivery personnel, except where predicated upon acknowledgement of order delivery, to eliminate the distraction and hassle of engaging in a cash-and-change situation in the venue.

It is a further object of this invention to provide a system which automatically checks the location information of the patron against a database of locations within the venue and determines the validity of the location and the level of available service and notify patrons if service is not available in that area, or offer only a menu of items specifically to be made available in that service area.

It is a yet further object of this invention to provide a system which simplifies the ordering process for repeat patrons through automatic identification of the patron's likely location within the venue, keeping track of the patron's billing information, and reorganizing the menu of item to with patron's favorites at the top of the list.

It is yet another object of this invention to provide a system which allows a fulfillment center to easily disable an entire class of service items, such as alcoholic beverages, which may be regulated by local laws, or limited in supply.

In one aspect, this invention features a remote ordering system for patrons at a large venue having identifiable delivery locations, in which a patron uses a handheld electronic communication device to order selected menu items. The order includes identification of the items ordered, the delivery location, and patron identification, and is transmitted to a central order-fulfilling site, where the order is assembled and thereafter delivered to the patron at the identified delivery location. Payment is done by a prearrangement involving prepayment, credit line, the preauthorized use of a credit or debit card, charge to the phone bill, or by cash.

The remote ordering devices may be special purpose hand-held devices especially designed for use in this system, or, alternatively, may be conventional hand-held wireless communication devices, such as cell phones, two-way pagers, or portable digital assistants (PDAs). In all cases, the system uses interactive communications of any type (visual, keyed or audible), or combinations thereof, between the ordering device and the order-taking computer to take the order and confirm the order.

In a system which accommodates cell phones, pagers and PDAs, the central processing station would include a first server at an Internet service provider, which receives data communications from the cell phones or two-way pager service provider, and a second Internet connected computer or server located at the venue.

The system can utilize visual or audible menus provided to the ordering device, or the patron can make orders from memory, or from a menu displayed on a sign, or a placard or printed in an event program. Preferably, the system includes a provision for confirming receipt of an order, and a provision for confirming order delivery/receipt, regardless of the type of communication device used.

These and other objects and features of this invention will become more readily apparent upon reference to the following detailed description of a preferred embodiment as illustrated in the accompanying drawings, in which:

BRIEF DESCRIPTION OF THE DRAWINGS

FIG. 7a is an example of a portion of the entries in a database which allows validity verification of the specified seat and its effective menu at a stadium or an arena;

FIG. 7b is an example of a portion of the entries in a database which allow validity verification of the specified booth and its effective menu at a trade show;

FIG. 7c is an example of a portion of the entries in a database which allow validity verification of the specified gate and its effective menu at an airport;

FIG. 8a is an example main menu with alcoholic beverages selection enabled;

FIG. 8b is an example main menu with alcoholic beverages selection disabled;

FIG. 8c is an example sub-menu with alcoholic beverages selection enabled;

FIG. 8d is an example sub-menu with alcoholic beverages selection disabled;

FIG. 10a shows example data base entries for the system of this invention;

FIG. 10b shows example data base entries for an on-line ticket merchant;

FIG. 11a shows a portion of a menu in standard order presented;

FIG. 11b shows example data base entries for the system of this invention including item purchase history;

FIG. 11c shows the revised order of presentation for menu portion in FIG. 11a, based on item purchase history of FIG. 11b;

DESCRIPTION OF THE PREFERRED EMBODIMENT

Figure 1:
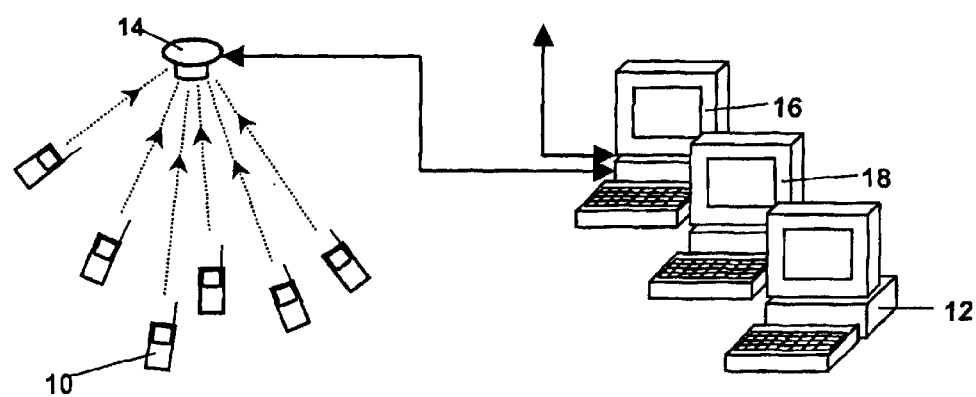
FIG. 1 is a diagram of a remote ordering system according to this invention which is based on a custom, application-specific, local area, wireless data communication network, using special design wireless, patron-operated remote communication devices.
Figures 3A, 3B, 3C, 3D:
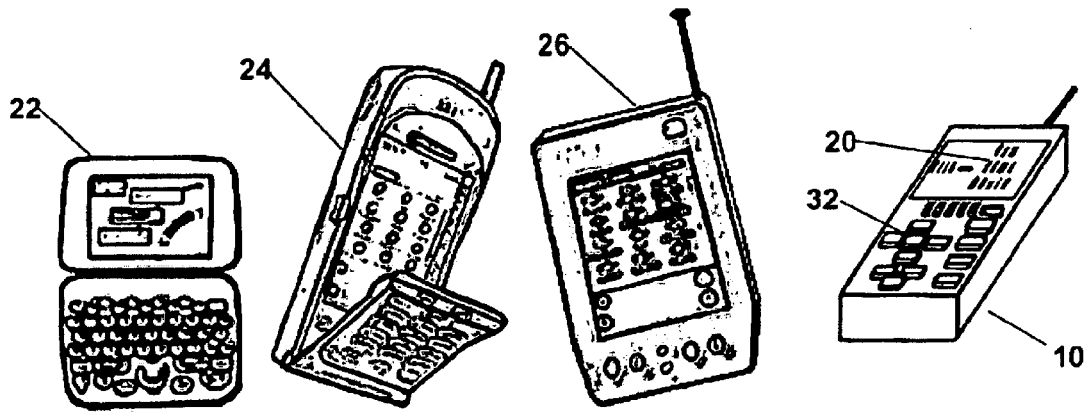
FIG. 3 is a depiction of various wireless, hand-held communication devices having displays, which useful in the remote ordering system of this invention depicted in FIGS. 1 and 2.

FIG. 1 depicts a system that uses a custom, application specific, local area, wireless data communication network. As patrons arrive at a venue/facility for a concert, game or other event, they will be presented with the opportunity to obtain a battery-operated wireless remote ordering device 10, illustrated in FIG. 3d, which will be available at a kiosk having a device rental station 12. Devices 10 are operable, as later described, to communicate an order for menu items to a transceiver node 14, which communicates orders from multiple remote ordering devices 10 to a fulfillment center having server 16 and order processing computers 18. In this embodiment, the remote ordering devices 10 and the base transceiver nodes/stations would be designed specifically for this application using available transceiver chip sets, and other off-the-shelf components such as keypads, microcontrollers, displays and the like which are commonly known to those skilled in the art. In FIG. 1, the base transceiver nodes 14 and other client work stations are networked to the local server computer 16 which maintains system records and facilitates the overall operation of the system.

These special devices 10 are stored in a combination battery charger/programming unit, or docking station, which keeps the devices batteries charged and provides the current menu of items offered for sale, which can be selectively presented for viewing on the device's display screen 20 or audibly via a speaker in the device. Ideally, a kiosk 12 would be prominently located adjacent each entrance to the venue. The special hand-held, wireless remote ordering devices 10 may take the form illustrated in FIG. 3d, and include the display 20, a plurality of alpha-numeric operation keys 32 for displaying and scrolling through menus, indicating item and quantity, and controlling the ordering process. In addition a microphone can be provided for voice ordering.

At this time, venue personnel will normally prearrange for payment for items subsequently ordered by the patron, and secure payment information in case the device 10 is not returned to the kiosk after the event has concluded. This may take the form of use of a credit or debit card, deposit of a predetermined amount of cash, or, for frequent patrons, tap a pre-established line of credit. The identification number of the wireless remote ordering device issued to the patron may then be recorded and the seat location identification entered into the device 10. The patron will then proceed to the seat and view the event.

It is also anticipated that the system of FIG. 1 may utilize an off-the-shelf local area wireless data communication network built on such standards as IEEE 802.11b or Bluetooth, which will become integral, or added as an option, to certain devices having general utility, such as PDAs and cell phones. This system offers the advantage of having a patron supply and care for his own wireless device, thus relieving the venue of the cost burden of providing them. However, the current lack of such patron-owned devices, or hesitance to rent one for the event, would require other parallel systems in order to provide service for the majority of patrons.

Figure 2:
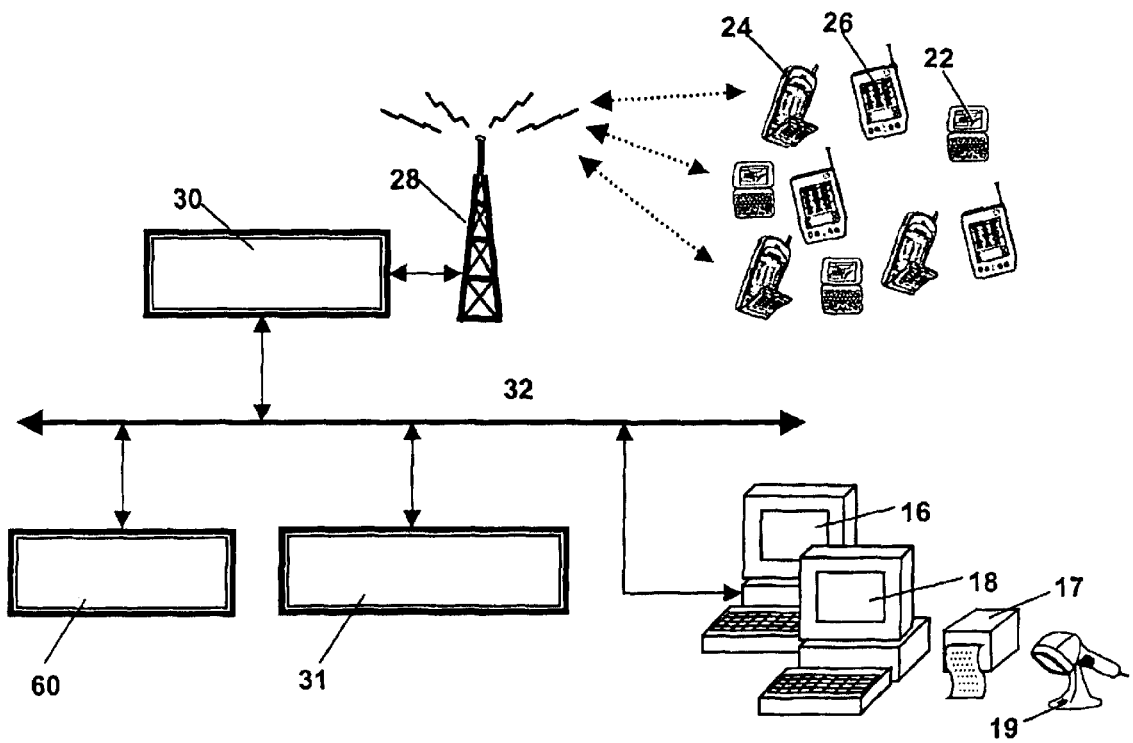
FIG. 2 is a diagram of a remote ordering system according to this invention which is based on the public wireless telecommunications and Internet infrastructures using cell phones, two-way pagers, PDAs and the like wireless, hand-held communication devices.

FIG. 2 illustrates a system that is based on the public wireless telecommunications and Internet infrastructures. In this system conventional hand-held wireless communication devices, such as two-way pagers 22 (FIG. 3a), cell phones 24 (FIG. 3b) and PDAs 26 (FIG. 3c) would also be useful as remote ordering devices. Here, a base transceiver station 28, such as a cell tower, transmits menu information to the wireless device and, receives orders with payment information from the wireless device. These signals would be routed by the telecommunications service provider 30 via the Internet 32 to menu/order server 31 which manages the order taking process and financial transaction software applications. When the order is complete, it is transmitted via the Internet 32 to the venue fulfillment center server 16 and order processing computers 18. Depending on the size of the venue and the number of fulfillment centers within it, there may be one or more order processing computers, and there may or may not be a need for a separate server 16.

Figure 9:
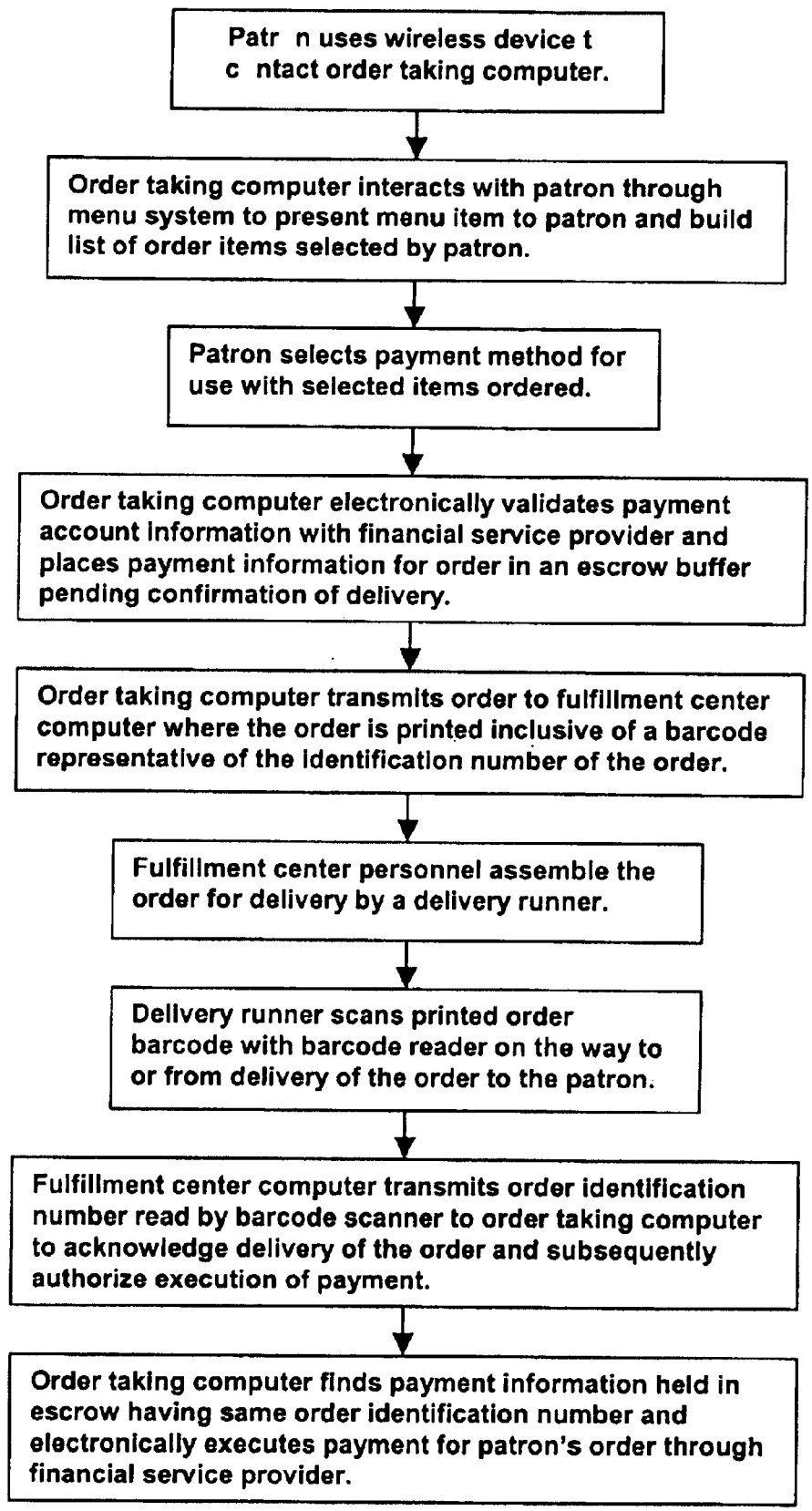
FIG. 9 is a flow chart showing system order flow, using barcode reader confirmation of delivery.

When the order is complete and accepted, confirmation of acceptance is transmitted back to the patron's wireless device, and the order details are forwarded to the order fulfillment center. When the order is received by the fulfillment center, it is displayed on the screen of order processing computer 18 and printed as an order ticket on printer 17. The order is assembled in the fulfillment center, typically by a delivery runner gathering the items listed on the order ticket, and then delivered to the patron's specified delivery location in the venue by the runner. Optionally, printer 17 may also print a barcode representative of the order identification number on the order ticket. The barcode is then scanned by barcode reader 19 when the delivery runner departs the fulfillment center to take the order to the patron, or upon return from delivery of the order to the patron. The scanned barcode order identification number is received by order processing computer 18 and transmitted back to the menu/order server 31 to confirm delivery of the order. Delivery confirmation triggers the menu/order server to execute the financial transaction over the Internet with financial service provider 60 using account information previously provided by the patron. This process is additionally described in the flow chart of FIG. 9.

Barcode reader 19 can be one of many devices well known to those skilled in the art of POS (point of sale) systems that are available from companies, such as Intermec or Metrologic. Similarly, the printer 17 can be one of many devices well known to those skilled in the art of POS that are available from companies, such as Canon, Epson, or Citizen. The order-processing computer 18 can also be one of many well known standard computers, which is outfitted for connection to a printer, barcode reader and the Internet, and running application software designed to execute the functions described. In a minimum cost system, the printer and the barcode reader may suffice as the entire input and output for the system during normal operation, thus eliminating the need for a screen and keyboard for order processing computer 18. Here, special commands can be given to the order processing computer through scanning of bar-coded command cards. For example, bar-coded command cards could include barcodes that enable or disable certain system features, enable or disable specific menu items that may be out of stock at this fulfillment center, perform certain system tests, authorize logging onto the Internet, and authorize the system to start or stop accepting orders for this fulfillment center. Likewise, the printer can act as the sole display/output device for both received orders and for response to the above described bar-coded commands.

Interactive Voice Response (IVR) technology in common use today provides the user with verbal choices to which keypad responses are given. For example, the IVR implementation of the system of this invention might include a spoken menu portion stating "for sandwiches press one, for snacks press two, for soft drinks press three, for beer press four, to check out press five." The response of the patron would be to press the keypad button corresponding with his selection. IVR technology can be used with any existing touch-tone telephone, including cell phones.

With the advent of advancing interactive voice recognition technology, it is contemplated that orders could be transmitted orally via microphones in the patron's wireless devices without the need to look down to find and press a particular button to respond. Voice recognition technology has advanced considerably, and will likely eventually sufficiently address the problems associated with accurate recognition in the presence of noisy backgrounds, the presence of audio distortion when cell phone reception is poor, and accents of both domestic and foreign origin.

In order to provide their customers access to the information-rich resources of the Internet, manufacturers of cell phones are adding digital services and mini browsers, and manufacturers of PDAs are adding wireless modem service to provide wireless Web services. New data communication protocols are being developed to deal with the limited resources of hand held wireless devices in an Internet environment, including WAP (wireless application protocol), and WML (wireless markup language). The advent of this technology provides a particularly useful alternative to IVR and custom devices for presentation of menu items and selection from them to create an order.

Although the capabilities of this combined infrastructure is in its infancy, it is believed that its current rapid market acceptance will not only make it a viable backbone on which to operate the remote ordering system of the current invention, but will in addition afford significant development cost savings to deploying such a system. As there are many suitable alternatives on which to base an embodiment of the current invention that are known to those skilled in the art, the specific wireless technology used, the specific multiple access communication protocol used, and the specific client/server hardware interface and protocol are not important to the system and method of the invention so long as they support the required functions. What is important is the method and system of this invention by which the customer is provided better service.

A spectator at a sporting event or concert has an entry ticket specifying his seat assignment for viewing the event. An exhibitor at a tradeshow in a convention hall has an assigned booth location for exhibiting the goods and services of his company. A traveler at an airport has an assigned departure gate for his flight. Spectators, exhibitors, and travelers each are located in a large venue, each have an identifiable delivery location within the venue, and each venue type has a concessionaire offering food, drink, and other items to the venue occupants. To place an order, the spectator, exhibitor, or traveler must provide information about the delivery location in the venue, select items from a menu for delivery, select a payment method, and provide associated payment account information.

The highest level of delivery location information is identification of the venue. If the system is closed, as in FIG. 1, the system knows only itself as the venue. If the system is open, as in FIG. 2, it is important that the venue identification be automatic to provide the simplest interface for patrons. This is easily accomplished through one of two means. First, each venue could have its own telephone number or wireless Web (i.e. World Wide Web, or Internet) address so that the system of this invention can automatically identify the venue via the number called or Web address used, even though many other aspects of the system are in common. Second, the cell phone infrastructure has been required by law (the FCC E911 mandate) to provide a means by which portable wireless devices can be located for emergency purposes, and optionally for commercial purposes. The implementation of this system has taken many paths, including GPS (global positioning system) receivers and cell tower triangulation schemes. It is contemplated that as the automatic location services mature, it will be possible to use a single contact number or Web address and automatically locate the venue of the patron.

Figures 5, 6A, 6B:
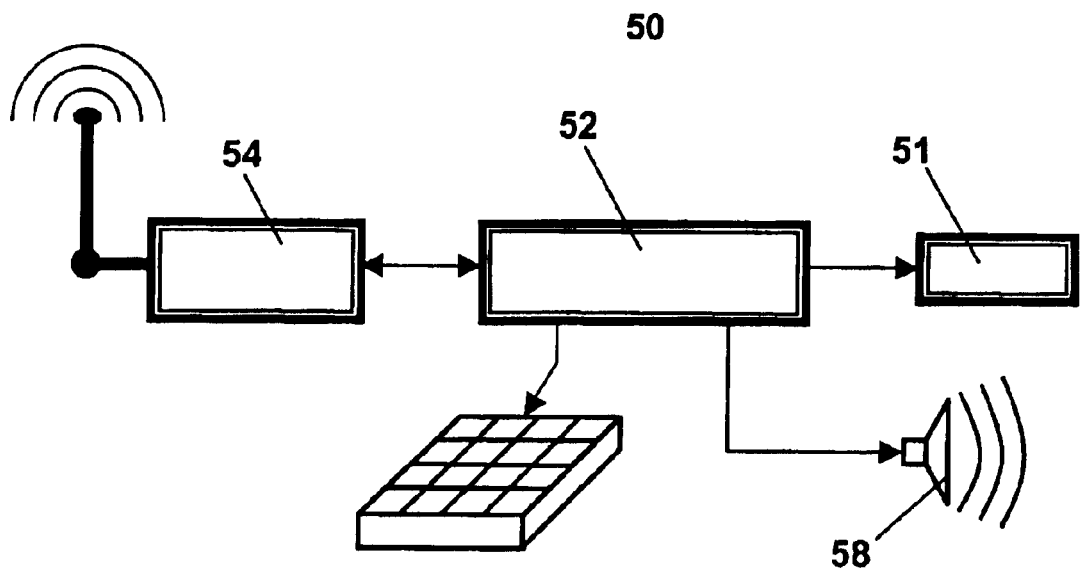
FIG. 5 is a block diagram of a wireless, hand-held communication device, having a display and a speaker for displaying and/or announcing menu offerings.
FIG. 6a show menu entry of location information.
FIG. 6b shows patron prompt to verify location information.

A first method for providing location information is by direct entry of the delivery location into wireless communication device 22, 24, or 26 as shown, for example, in FIG. 6a for a wireless Web device. In an IVR system, the prompts would be audible, with keypad responses to effect the same result.

A second method for providing location information is by indirect association of the identification number for wireless device 10, 22, 24, or 26 with a seat or delivery location that was previously stored in a patron database 82 as depicted in FIG. 10a. Database 82 could be created by the patron using an interactive Web page to create an account, or it could be created at a venue kiosk or over the telephone with a company representative that creates the account for the patron, thus resulting in the database creation. The patron's account database would preferably include at least a wireless device ID 70, patron payment account information 72, and possible delivery location information, such as season ticket seat location 74. For patrons using a cell phone as their wireless device, the wireless device ID number could simply be the phone number. When the patron contacts the remote ordering system of this invention, the wireless device ID 70 is provided to the remote ordering system, which searches all patron databases for a match. If a match is found, the associated patron database 82 is checked for seat location information. As previously described, the venue location is automatically identified, so database 82 is then searched for a mach to the specific venue entries 76. If there is a match to specific venue entry 76, the database will further contain seat location information indicating either that there are registered season tickets 78, or the date and location from which an order was last placed 80. In a case of registered season tickets, or of the prior order of record bearing of today's date, the seat location information is automatically prompted to the patron via his wireless device for confirmation, as shown in FIG. 6b. This provides a means of eliminating the need for time-taking manual re-entry of location information by the patron.

A third method of providing location information is an extension of the second method described above, wherein a search of the system database 82 results in a match for the patron via the wireless device ID 70, but no match for the venue seating or delivery location information 74, 76. Arrangements can be made with various of the on-line ticket merchants such that a subsequent automated search may be requested of the on-line ticket merchant database for the specific venue to determine if it has a database record 84 (FIG. 10b) for a ticket sale to the patron for an event on the current date. Thus, the system of this invention would transmit selected venue and patron information to the on-line ticket merchant necessary to conduct the search, and receive identified seat location information as a response if the on-line ticket merchant finds a match. For example, if it is May $7^{th}$ 2002 and the patron is at Key Arena, the local patron database 82 does not have valid seating information. However, the on-line ticket merchant database record 84 has matching entries for name fields, address fields, and email address fields as found in patron database 82, and a match for the venue and current date. It then returns the information that the patron has indeed purchased a ticket for this event with section 31, row 22, and seat 12 as the assigned seat. This seat location information is automatically prompted to the patron via his wireless device for confirmation as shown in FIG. 6b, thus providing a means of eliminating the need for time-taking manual re-entry of location information by the patron.

By any of the aforementioned means, a delivery location identification code is provided to the system for later use by delivery personnel. Preferably the code will directly use the coordinate system format of the venue, such as section/row/seat, or hall/aisle/booth, or concourse/gate. As is commonly known, the format generally contains some combination of alpha and numeric characters. The delivery location identification code may, however, also be constructed by some alternative coding scheme which is later translated to a form used by delivery personnel.

Having the specified location does not necessarily mean an order should be accepted. It is common for data entry by keyboard to contain errors. Additionally, service may not be available in all portions of the venue for marketing or logistics reasons. Furthermore, the seating layout in sports venues and the booth layout in convention centers often changes with each event, resulting in locations that existed and could be serviced during the prior event, but do not exist (or are unoccupied, such as behind the stage) and cannot be serviced during the current event. To maintain high confidence in the system by patrons, it is important that such errors be discovered prior to completing an order, and taking money from a patron in any manner. When the system determines that service is not available at the specified location a reply message can be sent to the patron indicating that service is not available at this location. If the location was entered in error, the patron then has another chance to correctly enter the location. Thus, upon receiving the specified location directly or indirectly, the server 16 or 31 checks the specified location against a database for the layout of viable delivery locations, such as shown by example in FIG. 7a for a stadium, FIG. 7b for a convention center, and FIG. 7c for an airport. If the specified seat in the stadium is section 202, row E, seat 5, it falls within the section range 60, row range 61, and seat range 62 for the stadium seating layout of FIG. 7a. If a patron were to specify his location as concourse G in the airport layout for FIG. 7c, it would be obvious that there was an error in the system and the order should not proceed or be accepted.

The system also provides a means for having multiple menus simultaneously available in different areas of the same venue in order to provide various levels of service. For example, the menu provided in the outfield bleachers at a baseball stadium may offer only a hot dog, hamburger, fries, cola, and beer menu, whereas in the section behind home plate, the menu might be expanded to include such items as BBQ sandwiches, wine, specialty beers, and ice cream sundaes. The example seating layout database of FIG. 7a contains entry 63 for section 202 indicating Menu B is to be presented to the patron, while entry 4 for section 203 indicates that Menu C is to be presented to the patron. In an airport setting, each concourse may not necessarily desire to offer a different level of service, but the logistics of available facilities and the distribution of specific brand franchise contracts may require a different menu 65 offering due to the different mix of items that can be offered. It is understood that each venue will have its own criteria for determining where any of multiple menus are offered, thus necessitating a database structure that flexibly relates one of multiple active menus within the venue to each specific seating or delivery location.

Many venues are subject to regulations limiting the service of alcoholic beverages during an event. In some cases, concession stands must terminate sales of beer and wine a fixed time period before the end of an event, such as 30 minutes before the end of the event or at the end of the $8^{th}$ inning at a baseball game. It is not reasonable to expect that patrons will know these laws and automatically comply. Also, there is no person taking orders to inform the patron that these items should no longer be ordered. Here, the server 16 or 31 running the automated order-taking application provides an input signal, which disables the ability of the patron to order the whole class of alcoholic beverages by one simple command. FIG. 8a is an example main menu with alcoholic beverages 66 enabled, while FIG. 8b is an example main menu after they have been disabled. FIG. 8c is an example sub-menu with alcoholic beverages 67 enabled, while FIG. 8d is an example sub-menu after they have been disabled. The switching from an enabled state to a disabled state for a class of items can be accomplished by one of many well known methods, including clicking on an icon on a screen of order process computer 18, entering a preset time at which the system will automatically make the switch, calling an IVR number and responding to a prompt that causes the switch, and as previous described, using a barcode read command.

Payment/credit information can be verified at the convenience of the venue such that the issuance process is speedy, yet identify a credit problem early prior to delivery of an order and prevent discovery of a payment problem later. In addition to use of common credit and debit cards as means of payment, corporate accounts and billing through third party accounts such as the customer's Internet service provider or cellular telephone service provider may possibly be arranged when the transaction is processed with these services. The payment transaction is conducted automatically during order processing, at a time when considered most effective and sufficiently processed or complete by the concessionaire. It can occur when the order has been successfully delivered to the fulfillment center computer, or when the order is assembled and ready for delivery, or when it is taken by the runner from the fulfillment center for delivery, or when it is delivered to the patron, or when the runner returns to the fulfillment center after delivery.

The automatic execution of the payment transaction is triggered by receipt of an acknowledgement signal triggered by occurrence of a predetermined event, such as indicating that the physical order has been delivered, or will be imminently delivered to the patron. The acknowledgement signal can take the form of an inter-computer handshake indicating successful delivery of the order to the fulfillment center, or data generated by a barcode scanner used by order fulfillment personnel to read the barcode printed on the order tickevreceipt during some phase of order processing, or a signal generated when keying or clicking a response to a displayed order ID to indicate order completion. Speed and simplicity are enhanced by removing human action to effect payment of the order. The system is preferably designed to minimize or eliminate time-consuming and error-prone acknowledgement by the patron or delivery personnel to achieve a degree of efficiency and accuracy acceptable to the concessionaire. To this end, it is preferable to maximally utilize automatic or semi-automatic acknowledgement of order delivery.

It is commonly understood that an ordering system must also include a means to cancel or refund orders that are in error, are excessively late, are not able to be filled, or for some reason are not deliverable. Assuming that in the end all erroneous charges to a patron's account are corrected, then the choice of degree of acknowledgement automation, and the choice when during order processing the acknowledgement is given, create a trade-off decision which must balance the reduced cost of labor in an efficient system with the added system cost to achieve system efficiency, and with the added cost of labor and the good will lost when correcting billing errors.

Figure 4:
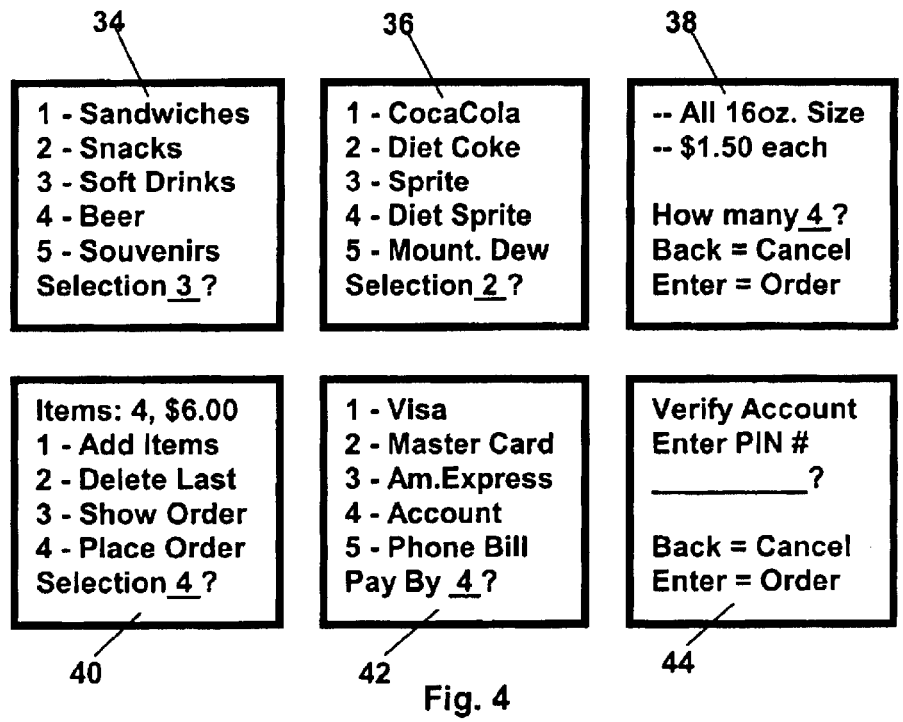
FIG. 4 is a sample series of menus of items available for order and purchase, which can be presented to the devices of FIG. 3.

FIG. 4 displays sample hierarchical menus that are programmed into special remote ordering devices 10 and illustrate the variety of functions possible. The menus include a major item classification menu 34, a drink menu 36 and sub-menu 38, a control menu 40, a payment menu 42 and a verification menu 44. These menus are also transmittable through the FIG. 2 system for display on or announcement by conventional hand-held wireless devices 22, 24, 26 brought into the venue by patrons.

This system of menus, carried by or transmittable to the remote ordering devices, enables patrons to easily select any quantity and variety of items at any time while in the venue, order and pay for the items, all without moving from the patron's seat, booth or gate. Also, orders may be placed from any location within the venue by a patron for delivery to the patron's specified location in the venue. This contrasts with systems where orders are taken by order-taking personnel, such as wait staff, but only from the patron while the patron is seated.

As hierarchical menu systems have become common with the advent of automated teller machines and windowed graphical user interfaces on modern computer operating systems, the concept will not be further described here. If one of the conventional devices 22, 24, 26 are used, the menu system can be accessed form a telephone number or Web address provided to the patron, either on the admission ticket, event program, or on signs in the venue.

The system need not be restricted to operating from a transmitted hierarchical menu system, but may alternatively use a fast entry method such as entering a series of numbers separated by the # key, wherein the numbers are item order reference numbers found on a printed menu adjacent to each item. Likewise, as voice recognition technology improves sufficiently to handle background venue noise and the diversity of accents, direct statements of the menu item names may become be practical. The continuing trend in miniaturization, in combination with practical voice recognition may further allow for today's hand held devices to possibly be worn on the wrist, attached to the ear, or otherwise migrated away from the strict definition of a hand held device. As such, the meaning of hand held, as used herein, is intended to include such evolutionary miniaturizations of today's technology. In any case, the patron's wireless device is used to communicate with an automated system to take the customers order.

An example remote ordering device 50 useful in the system and method of this invention is illustrated in FIG. 5. It includes a microprocessor 52, a transceiver 54, a display 50, and a speaker an/or microphone 58. Device 50 transmits and receives information preferably via infrared or radio transmission. As can be readily seen, there are numerous types of commercially-available devices which fulfill the functional definition of the remote ordering device of the system of this invention. One or more remote order transceiver nodes 14 are each used to communicate with numerous of the remote ordering devices by means that avoid overlapping transmission conflicts, such as time division multiplexing, polling, collision detection and avoidance, all of which are well developed technologies and well known to those skilled in the art. In the FIG. 2 embodiment where the public wireless communication and Internet infrastructures are used, the base transceiver nodes 14 become embodied as the various service provider transceivers 28 used to communicate with cellular telephones, two-way pagers, PDAs and the like.

Most venues will necessarily have several order fulfillment centers. As venues can be quite large, it would be impractical to deliver all orders from a single processing location, but rather to have multiple locations in a large venue in order to be close to the customer, thus minimizing the route for physical delivery. To assure prompt and accurate delivery of orders, it is necessary to identify the location of the patron's seat to determine which order fulfillment center within the venue to send the order to. This is easily accomplished by comparing the patron's specified location with a simple lookup table or database containing layout information for the venue and having a specific fulfillment center assigned to serve each location or group of locations. One basis for selecting a particular order fulfillment center is its ability to promptly deliver an order to the identified location. Prompt delivery to a specific location is generally dependant on the location of access tunnels, fences and other physical barriers, as well as the relative capacity of each fulfillment center. Such barrier and capacity information can be used directly to associate, within a database, a particular fulfillment center with specific delivery locations. Choice of fulfillment center is affected by availability of an ordered item when ordered.

Although the primary description here is in terms of a hand held wireless transmitter with a keypad and display such as the emerging WAP (wireless application protocol) web enabled cellular telephones, it should be recognized that IVR and voice recognition technology with CTI (computer telephony integration) technologies can enable automated navigation and data entry in verbal format for spectators with older cellular telephones.

At any time during the event, the patron can page/scroll through the hierarchical menus displayed on or announced by the remote ordering device and use its various keys or audible commands to identify and select items for ordering, review the order, transmit the order, and receive confirmation that the order has been accepted for processing. As is well understood by those skilled in the art, the simple menu system as portrayed in FIG. 4 relates to the limited display capabilities on today's mini-browser cellular telephones and related devices. However, as time moves on, much higher text densities, graphics, and even color will become commonplace and represent only the natural evolution of the method of this invention. As hierarchical menu systems have become ubiquitous with the advent of automated teller machines and windowed graphical user interfaces on modern computer operating systems, the concept will not be further described here.

Menu items offered can comprise the usual items of food, drink, and souvenir merchandise, but can also include such items as tickets to future events, and services, such as restaurant, lodging and transportation reservations, advertising of all kinds, and statistical data during sporting events, biographical and recording data for concert artists, future schedule of events, and myriad other information. A menu of items of this information can be conveyed visually, audibly, or via a combination of both media forms.

An order includes payment account information. The patron can explicitly enter the payment account information, such as credit card number and expiration date, during the ordering session. Although this method is particularly important to enable first time users, it is preferable to eliminate the need for time-taking manual entry of this information for regular patrons by including payment account information 72 in patron database 82. When an order is placed and the wireless device ID is received and matched by server 16 or 31 with device ID 70 in patron database, payment account information can automatically be associated with the order. To verify that the authorized person is actually using the wireless device, a PIN number entry would be requested of the patron and compared against the PIN number recorded in the payment account information 72 portion of patron database 82.

As previously mentioned, a barcode representative of the order identification number can be printed on the order ticket when it is received in the fulfillment center, and then later be scanned by barcode reader 19 when the delivery runner departs the fulfillment center to take the order to the patron, or upon return from delivery of the order to the patron. Scanning of the barcode confirms delivery and triggers server 16 or 31 to automatically execute the financial transaction as further detailed in the flow chart of FIG. 9.

Maintaining the attention and patience of the patron throughout the ordering process is fundamental for achieving high satisfaction ratings and maximum return business from patrons. To help achieve this objective, a further refinement of the menuing portion of the system is shown in FIGS. 11a, 11b, and 11c. Patron database 90 is designed to additionally record the purchase history for each menu item that the patron has purchased. These histories need to be organized according to purchases at each venue each patron has attended and made purchases. In the example database record 90, the food and drink items 91 each have an associated number indicating the number of times patron has purchased the item. FIG. 11a depicts the normal order for presenting items to the patron, while FIG. 11c depicts the same items in an order modified by the purchase history of patron, with the most frequently purchased items being presented closest to the start of the list. This minimizes the time necessary for the patron to spend ordering and maximizes the time spent doing whatever he is at the venue to do.

Figure 12A:
FIG. 12a. shows a portion of a menu offering a predetermined "Usual Order"
Figure 12B:
FIG. 12b. shows the contents of the Usual Order.

A second method for reducing the menu navigation time for the patron is providing access to his specific patron database through an Internet Web page or other means so that he can create and edit a list of items available from a particular venue that the patron will call the Usual Order or Favorite Order. Then when at the venue, the first item presented in the menu will be patron's Usual Order as depicted in FIG. 12a. Selecting the Usual Order from the menu list would then list the contents of the Usual Order and provide patron with an option to order or cancel the selection, as shown in FIG. 12b.

At the end of the event, patrons having a conventional communication device 22, 24, 26, merely pocket their devices and exit the venue. Those patrons having borrowed or rented special devices 10 will return them kiosk 12. If a patron should inadvertently exit the facility without returning remote ordering device 10, this will be detected, either through loss of signal, detection of a special signal, or simply by transmitting a reminder message at or near the end of the event, such that it will initiate emission of audible beeps to remind the patron that unit 10 should be returned to kiosk 12.

Although device 10 is illustrated as a hand-held unit, it could be augmented by addition of a strap or cord to hang around the patron's neck or attach to other portions of the body, thus reducing the incidence of dropping the unit during celebration or applause. This would also reduce incidences of patrons leaving units 10 at their seats and forgetting to return them to kiosk 12.

Many benefits accrue through use of the system and method described herein: Patrons receive a higher level of service by having the ability to order, receive, and pay for any combination of items that are available at the venue with minimal time spent. At spectator venues, the patrons need not leave their seats, stand in line, miss portions of the event, or be limited to only cash on hand. In airports, patrons in a hurry do not have to choose between being hungry or missing their flight, and can avoid the hassle of dealing with small children at a concession stand. At tradeshows and conventions, booth operators can order and eat without abandoning their booths, and can even entertain at the booth by ordering items for their customers and clients.

Organizers of spectator events and facility owners can benefit from being able to charge more for those seats that are located in sections of the stadiums, concert halls, and amphitheaters that are equipped with this system, or further differentiate between levels of service provided in different sections by providing a limited menu in less-costly seats, while providing an upscale menu in more expensive seating areas. Event sponsors can further benefit from the ability to advertise and sell their special event-related items off the device merchandise menu list, sell tickets to future events, present event-related information, and offer advertising, reservation, announcement and advertising.

Vendors of snacks and gift items at these events would also benefit, because:

a) Ordering peaks at event breaks are leveled, thus reducing the need to carry extra staff for those peak moments and decreasing the percentage of labor in cost of goods sold.

b) Sales per customer will increase from recapture of sales lost from customers dreading standing in long lines or limited availability of items from hawkers.

c) Sales per customer will increase by allowing credit card sales which are proven to generate individual orders averaging approximately 60% in fast food venues.

d) The monetary transaction is automated and cashless. This reduces the time and cost of manual handling and accounting, and reduces risk of employee pilferage.

Although only a preferred embodiment has been described in detail, many modifications are contemplated within the scope of this invention, as defined by the following claims.

We claim:

1. A system for the remote ordering of items from a menu for delivery from an order fulfillment center located in a large venue having identifiable delivery locations, said system enabling a patron to self-order selected menu items, via voice and/or keypad input on a wireless, hand-held communication device over the public wireless and Internet communications infrastructure, for delivery to an identified delivery location, comprising:

an order-taking computer for interactively communicating with said device over the public wireless and Internet communications infrastructure, including means responsive to the patron's input to assemble an order, means for associating a delivery location identification code for the identified delivery location with said order, means for use with said delivery location identification code for determining availability of delivery service to the identified delivery location, an order-processing computer, apart from said order-taking computer, for receiving orders from said order-taking computer and displaying orders for selected items, including delivery locations, to order fulfillment personnel, means for confirming order receipt by said order-processing computer to said device, at least one wireless transceiver node, which is part of the public wireless and Internet communications infrastructure, for receiving orders from a plurality of said communication devices and communicating them to said order-taking computer, and means for providing patron payment account information to associate with the order when placed and automatically charging the cost of the order to the patron account upon occurrence of a predetermined event without intervention by the patron or order fulfillment personnel apart from delivery confirmation.

2. The system of claim 1, where said order-taking computer is an Internet connected server hosting an order-taking application.

3. The system of claim 1, further including venue identification means for use with said order-taking computer to automatically determine availability of service to the identified delivery location.

4. The system of claim 1, 2 or 3, wherein the venue has a plurality of order fulfillment centers, including means for automatically directing said order to a selected one of the plurality of venue order fulfillment centers, said one order fulfillment center being selected to provide prompt delivery to the identified delivery location.

5. The system of claim 4, wherein the venue is a spectator venue having identifiable seats as delivery locations, each patron has an entry ticket, and the delivery identification code is a seat identification code that includes a series of alphanumeric characters printed on the ticket, separate and distinct from the standard section-row-seat location information.

6. The system of claim 1, 2 or 3, wherein the venue is a convention hall having display booths occupied by patrons as delivery locations.

7. The system of claim 1, 2 or 3, wherein the venue is an airport terminal having departure gates as delivery locations, and the patrons are passengers.

8. The system of claim 1, 2 or 3, including a patron database preexisting said order and containing patron delivery location identification code information, and patron wireless communication device identification information.

9. The system of claim 8, including means for receiving wireless communication device identification associated with said order for use with said patron database means for automatically providing said delivery location identification code.

10. The system of claim 1, including means for confirming delivery of the order to the order processing computer.

11. A method of remote ordering of items from a menu for delivery from an order fulfillment center at a large venue having identifiable delivery, locations, by a patron having a hand-held wireless communication device that has the utility for communications via public wireless telecommunications and Internet infrastructure, for delivery to a specified delivery location, comprising the steps of:

providing an order-processing computer, using said device by the patron to transmit an order via the existing public wireless communication and Internet infrastructure to said order-processing computer for communication to order fulfillment personnel at said order fulfillment center, associating the specified delivery location with the order, automatically determining availability of delivery to the specified delivery location, processing the order, and delivering the order to the specified delivery location, providing patron payment account information to associate with the order when placed, and automatically charging the cost of the order to the patron account upon occurrence of a predetermined event without intervention by the patron or order fulfillment personnel apart from delivery confirmation.

12. The method of claim 11, including the step of confirming the acceptance of the order by the processing computer to said device.

13. The method of claim 11, including the step of confirming delivery of the order to the order processing computer.

14. The method of claim 11 including the steps of providing menu item information to said patron for selection by said device, determining a patron's past ordering history when said patron is identified to the order-taking computer, and presenting items for selection by said patron on said device audibly and/or visually, in a sequence based on the past purchase record of the patron.

15. The method of claim 14, including the steps of creating a predetermined group of items as a "favorite order" from said past purchase record, and presenting the "favorite order" as part of said menu item information.

16. A system for the remote ordering of items from a plurality of menus for delivery from an order fulfillment center located in a large venue having identifiable delivery locations, said system enabling a patron to self-order menu items, via voice and/or keypad input on a wireless, hand-held communication device, for delivery to an identified delivery location, comprising:

means for associating an identification code for the identified delivery location in said venue with an order, an order-processing computer for providing one of said menus of items offered for sale to said device over the public wireless and Internet communications infrastructure and including a database indicating which of said plurality of menus is to be made available for said identified delivery location, said order-processing computer receiving an order of selected items sent by the patron from said device and communicating said order to order fulfillment center personnel, means for confirming order receipt by the order-processing computer to the device from which the order was received, at least one transmitter/receiver node for receiving orders from a plurality of said devices and communicating them via said order-processing computer for display to order fulfillment center personnel for subsequent order delivery to identified locations, means for providing patron payment account information to said computer in association with said order when said order is placed, and payment charging means for automatically charging the cost of an order to said payment account upon occurrence of a predetermined event without intervention by the patron or order fulfillment personnel apart from delivery confirmation.

17. A system for the remote ordering of items from a menu for delivery from an order fulfillment center located in a large venue having identifiable delivery locations, said system enabling a patron to self-order menu items, via voice and/or keypad input on a wireless, hand-held communication device for delivery to an identified delivery location, comprising:

means for associating an identification code for the identified delivery location in said venue with an order, an order-processing computer for providing a menu of items offered for sale to said device, receiving an order for items selected from said menu that is transmitted from said device, and communicating said order to order fulfillment center personnel, said order-processing computer having means for disabling selection of one or more menu items to prevent their inclusion in patron orders, means for confirming order receipt by the computer to the device from which the order was received, at least one transmitter/receiver node for receiving orders from a plurality of said devices and communicating them via said computer for display to order fulfillment center personnel for subsequent order delivery to said identified seat location, and means for providing patron payment account information to said computer in association with said order when said order is placed, and automatically charging the cost of the order to the patron account upon occurrence of a predetermined event without intervention by the patron or order fulfillment personnel apart from delivery confirmation.

18. The system of claim 17, wherein the menu items for which selection is disabled are a predetermined class of menu items.

19. The system of claim 18, wherein the class of menu items for which selection is disabled includes alcoholic beverages.

20. The system of claim 17, 18 or 19, wherein said disabling means includes a barcode scanner for reading a barcode representative of a command to disable said selection of menu items.

21. The system of claim 17, 18 or 19, wherein said disabling means include means for automatically disabling selection at a predetermined time.

22. The system of claim 17, 18 or 19, wherein the disabling means includes a barcode reader responsive to reading one or more predetermined barcodes, each representative of a different said selection of predetermined menu items, and producing a signal directing the system to disable corresponding selection of one or more of said predetermined menu items.

23. A system for the remote ordering of items from a menu for delivery from an order fulfillment center located in a large venue having identifiable delivery locations, said system enabling a patron to self-order menu items, via voice and/or keypad input on a wireless, hand-held communication device, during an event, for delivery to an identified delivery location, comprising:

means for associating an identification code for the identified delivery location in said venue with an order, an order-processing computer for providing a menu of items offered for sale to said device, receiving an order for items selected from said menu that is transmitted from said device, and communicating said order to order fulfillment center personnel, means for confirming order receipt by the computer to the device from which the order was received, at least one transmitter/receiver node for receiving orders from a plurality of said devices and communicating them via said computer for display to order fulfillment center personnel for subsequent order delivery to said identified seat location, printing means for producing an order ticket for each order, including means for printing a barcode specific to each order on the order ticket, means for providing patron payment account information to said computer in association with said order when said order is placed, a barcode reader for reading the barcode when the order is ready for delivery, or has been delivered, and payment charging means responsive reading the barcode for automatically charging the cost of an order to the patron account without intervention by the patron or order fulfillment personnel apart from delivery confirmation.

24. The system of claim 1, 16, 17 or 23, including patron a database preexisting said order that contains patron wireless communication device identification information and patron order history information, and means for receiving wireless communication device identification associated with said order for use with said patron database means for automatically presenting items for selection by said patron on said device audibly and/or visually, in a sequence based on the patron's order history information.

25. The system of claim 1, 16, 17 or 23, including patron a database preexisting said order that contains patron wireless communication device identification information, means for the patron to access said database and create a "favorite order" from items on said menu, and means for receding wireless communication device identification associated with said order for use with said patron database means for presenting said "favorite order" as an item for selection by the patron on said device audibly and/or visually.

26. A method of remote ordering of items during an event by a patron from a menu for delivery from an order fulfillment center at a spectator venue having identifiable seat locations, where the patron has a wireless, hand-held communication device having means for communicating via voice or keypad input, comprising the steps of:

providing a patron database for each patron, using said device to place an order with said fulfillment center for selected menu items, using patron database information to access a third party ticket sales database, compare patron information common to the databases to determine if patron bought a ticket to said event, and using the seat location information in the ticket sales database to automatically provide seat location information for inclusion with said patron's order to identify order delivery location, providing patron payment account information for use in association with the order when placed, confirming acceptance of a patron's order to said device, the order including the selected menu items, the seat location identification code, and the payment account information, communicating the order and said delivery location to order fulfillment personnel, processing the order for fulfillment, delivering the order to the identified seat location, confirming order delivery, and automatically charging the cost of the order to the patron account upon occurrence of a predetermined event without intervention by the patron or order fulfillment personnel apart from delivery confirmation.

* * * * *